3,371,096
**4-PYRIDYLMETHYL KETONES AND
4-PYRIDYLMETHYL CARBINOLS**
Bernard Brust, Parsippany, Troy Hills, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 465,775, June 21, 1965. This application June 28, 1967, Ser. No. 649,470
12 Claims. (Cl. 260—294.8)

ABSTRACT OF THE DISCLOSURE

Novel pharmacologically active 4-pyridylmethyl ketones and 4-pyridylmethyl carbinols are prepared inter alia by reacting a 4-picolyl metal with an acid halide or an aldehyde, respectively. The compounds of this invention are useful as anti-tremor agents, anti-convulsants and in treating diseases caused by metabolic failures of enzyme systems, for example, phenylketonuria.

Related applications

This application is a continuation-in-part of application Serial No. 465,775 filed June 21, 1965, now abandoned and which is in turn a continuation-in-part of application Serial No. 392,276 filed Aug. 26, 1964, and now abandoned.

Detailed description

This invention relates to novel 4-pyridylmethyl ketones, to novel secondary carbinols derived therefrom and to processes for making same. In one particular aspect, the invention comprises novel 4-pyridylmethyl ketones of the formula

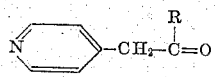

I wherein R is a member selected from the group consisting of fluoro-substituted phenyl, lower alkoxy-substituted phenyl, cycloalkyl radicals having 3 to 8 carbon atoms in the ring, a 5-member heterocyclic group and a 6-member heterocyclic group.

In another aspect the invention comprises 4-pyridylmethyl carbinols of the formula

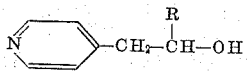

II wherein R has the same significance as above.

Additionally, the invention embraces within its scope salts of the compounds represented by Formulas I and II with medicinally acceptable acids such as hydrohalic, e.g., hydrochloric and hydrobromic, sulfuric acid, paratoluene sulfonic acid, nitric acid, maleic acid, fumaric acid, succinic acid and the like.

The term "fluoro-substituted phenyl" as used in this application comprehends phenyl groups having one or more fluorine substituents in the ortho-, meta- or para-positions of the phenyl ring and encompasses also phenyl radicals which are similarly substituted by trifluoromethyl groups. The term "lower alkoxy-substituted phenyl" comprehends phenyl groups having one or more lower alkoxy groups in either the ortho-, meta- or para-positions of the phenyl radical. The lower alkoxy substituents encompassed within the term are the ethers of lower alkyl groups which include saturated straight and branched chain aliphatic hydrocarbon radicals such as methyl, ethyl, butyl, propyl, isopropyl, etc The term "cycloalkyl" comprehends saturated monocyclic hydrocarbons containing 3 to 8 carbon atoms in the ring. Representative of such radicals are cyclopropyl, cyclobutyl, cyclopentyl, cyclohexyl, etc. The heterocyclic radicals encompassed by the terms "5-member heterocyclic group" and "6-member heterocyclic group" of this disclosure are the monocyclic 5 and 6 membered heterocyclic rings having at least one hetero atom in the ring which can be either nitrogen, oxygen or sulfur. Representative hetero radicals falling within this description are, for example, pyridyl, e.g., 2-, 3- or 4-pyridyl, thienyl, e.g., 2-thienyl, furyl, e.g., 2-furyl and pyrryl. As comprehended by this application the cycloalkyl and heterocyclic radicals as defined above may contain additional substituents such as halogen, hydroxyl, lower alkyl, lower alkoxy and the like.

The compounds of this invention relieve or diminish tremors which are brought about in animals by Tremorine, i.e., 1,4-dipyrrolidino-2-butyne, with a minimum of peripheral anti-cholinergic side effects. Additionally, they reduce hypothermia produced by Tremorine. Thus, the compounds are indicated for use in the study of the treatment of tremors which are characteristic of Parkinson's Disease. For example, the compounds of this invention when administered orally to animals such as mice relieve Tremorine-induced tremors in single dose amounts ranging between about 28 and about 88 mg./kg. By way of illustration the compound cyclohexyl-4-pyridylmethyl ketone which has an $LD_{50}$ of $>500$ mg./kg. orally in mice exhibits activity in the anti-tremorine test when administered at a single oral dose of 38 mg./kg. The anti-tremorine test employed in determining anti-Parkinson activity was carried out as follows:

Six mice of both sexes weighing 17 to 22 grams were employed per dose level. The test compounds were administered orally and one-half hour later 20 mg./kg. of Tremorine was administered intraperitoneally. The Tremorine-treated mice were observed for 30 minutes. Animals not exhibiting tremors within this time were considered protected. The $ED_{50}$ is calculated by the method of Miller and Tainter (Proc. Soc. Exptl. Biol. Med., volume 57, page 261, 1944).

As a further illustration of the anti-tremorine activity of the compounds of this invention other exemplary compounds were active in the above-described test as follows:

| Compound: | $ED_{50}$ (mg./kg.) |
|---|---|
| 4(2-fluorophenacyl)pyridine | 70 |
| 4(3-fluorophenacyl)pyridine | 61 |
| 4(4-fluorophenacyl)pyridine | 28 |
| 1-(3-fluorophenyl)-2-(4-pyridyl)ethanol | 87 |
| 1(4-methoxyphenyl)-2-(4-pyridyl)ethanol | 88 |

By way of comparison the known anti-Parkinson agent α-cyclohexyl-α-phenyl-1-piperidine propanol exhibits activity in the above-described anti-tremorine test at an oral dose of about 19 mg./kg.

Furthermore, the compounds of this invention alter the activity of the liver microsomal drug metabolizing enzymes. For example, they inhibit the following enzymatic oxidative reactions: hexobarbital to ketohexobarbital, acetanilid to p-hydroxyacetanilid, amphetamine to phenylacetone, dilantin to its p-hydroxy derivatives, etc. On prolonged administration the compounds of this invention stimulate the activity of the liver microsomal drug metabolizing enzymes. Because of their activity these compounds provide a valuable tool for the study of the drug metabolizing enzyme systems associated with the liver microsomes and are useful in the study and treatment of diseases caused by metabolic failures of such enzyme systems, for example, in the treatment of phenylketonuria.

Furthermore, the compounds of this invention have unexpected anti-convulsant activity and hence are useful as anti-convulsant agents. For example, the compounds of this invention when administered orally to animals such as mice exhibit anti-convulsant activity at single doses in amounts of about 175 mg./kg. and higher. By way of illustration cyclopropyl-4-pyridylmethyl ketone exhibits activity in the standard anti-metrazol test when administered at a single oral dose of 177 mg./kg. By comparison phenolbarbital, a well known anti-convulsant agent, exhibits activity in the same test at a dose of about 70 mg./kg. Thus, the compounds of this invention have demonstrated pharmacological effects in warm blooded animals qualitatively similar to those of well-known clinically useful therapeutic agents.

In general, the compounds can be formulated with conventional inert adjuvants into dosage forms suitable for oral or parenteral administration. Such dosage forms include tablets and capsules as well as solutions and suspensions. The frequency of administration is variable depending upon the needs and requirements of the patient.

The ketones of this invention, i.e., the compounds of Formula I, are prepared by the reaction of a picolyl metal compound having the formula

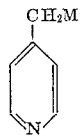

III wherein the symbol M represents an alkali metal such as sodium, potassium or lithium with an appropriate acid halide of the formula

RCOX    IVa wherein R has the same significance as above and X represents a halide viz. chlorine, bromine, iodine or fluorine with chlorine and bromine being the preferred halides.

Representative acid halides answering to this description are, for example, the fluoro substituted benzoyl chlorides, for example, 2-fluorobenzoyl chloride, 3-fluorobenzoyl chloride and 4-fluorobenzoyl chloride; the lower alkoxy substituted benzoyl chlorides, for example, methoxybenzoyl chloride, ethoxybenzoyl chloride and the like; cycloalkyl carboxylic acid halides, for example, cyclopropyl carboxylic acid chloride, cyclobutyl carboxylic acid chloride, cyclopentyl carboxylic acid chloride, cyclohexyl carboxylic acid chloride and the like; the halides of 5- or 6-membered heterocyclic carboxylic acids, for example, a halide of a pyridine carboxylic acid such as the chloride or 2-pyridine carboxylic acid; a chloride of 4-pyridine carboxylic acid; a halide of a furoic acid such as a chloride of 2-furoic acid; a halide of a thiophene, carboxylic acid such as a chloride of 2-thiophene carboxylic acid; a chloride of a pyrrol carboxylic acid such as a chloride of 2-pyrrol carboxylic acid; and ring-substituted derivatives of the cycloalkyl carboxylic acid halides and the 5- or 6-member heterocyclic carboxylic acid halides bearing one or more substituents selected from the group consisting of lower alkyl, hydroxyl, lower alkoxy, halogen and the like. Halides, of the named compounds, other than the chlorides could also be used.

Alternatively, the ketones of Formula I can be prepared by the reaction of a picolyl metal compound of Formula II with an appropriate ester of the formula

RCOOR'    IVb wherein R has the same significance as above and R' represents an aliphatic hydrocarbon radical such as alkyl, e.g., lower alkyl such as methyl, ethyl, butyl and the like or aryl such as phenyl or an aralkyl such as benzyl.

Representative esters answering to the above description which are suitable for use in the practice of this invention are, for example, alkyl esters of fluoro substituted benzoic acid, for example, methylfluorobenzoate, ethylfluorobenzoate, etc.; an alkyl ester of a lower alkoxy substituted benzoic acid, for example, the methyl ester of methoxy substituted benzoic acid; an alkyl ester of a cycloalkyl carboxylic acid, for example, the methyl, ethyl, propyl, etc. esters of cyclopropyl carboxylic acid, cyclopropyl carboxylic acid, cyclobutyl carboxylic acid, cyclopentyl, carboxylic acid, cyclohexyl carboxylic acid, ring-substituted esters of cycloalkyl carboxylic acid bearing one or more substituents such as lower alkyl, lower alkoxy, hydroxy, halogen and the like; an alkyl ester, for example, a methyl, ethyl, propyl, etc. ester of a 5- or 6-member heterocyclic acid such as 2-pyridine carboxylic acid, 4-pyridine carboxylic acid, 2-furoic acid or 2-thiophene carboxylic acid; and ring substituted esters of 5- and 6-member heterocyclic acids bearing one or more substituents such as hydroxy, halogen, lower alkyl and lower alkoxy.

While the ketones of Formula I can be prepared by reacting either an acid halide of the type represented by Formula IVa or an ester as represented by Formula IVb with a picolyl metal compound of Formula III, in actual practice, it is preferred to use the esters.

The above reaction of a picolyl metal compound of Formula III with an acid halide of Formula IVa or with an ester of Formula IVb is carried out by first preparing an organic solvent solution of the 4-picolyl metal compound of Formula III. In general, any organic solvent in which the 4-picolyl compound is soluble and which is inert under the reaction conditions employed can be used in preparing this solution. Solvents which are suitable for use in the practice of this invention include, for example, benzene, diethyl ether, toluene, tetrahydrofuran and the like. Mixtures of these solvents can also be used, if desired.

The reaction of the 4-picolyl metal compound with an acid halide of Formula IVa or with an ester of Formula IVb is suitably carried out by first cooling the solution of the 4-picolyl metal compound to a temperature below room temperature. Any appropriate means can be used to effect the cooling. In a preferred embodiment of the invention, the solution is cooled to a temperature of about 0° C. or lower. Preferably, the solution of the 4-picolyl metal compound is cooled to a temperature within the range of about −10° C. to about −60° C. Thereafter, the Formula IVa or IVb reactant, dissolved in a suitable solvent, is added to the cooled solution of the 4-picolyl metal compound. In preparing the solution of Formula IVa or IVb reactant, one can use any solvent in which the compound is soluble and which is inert under the reaction conditions employed. Such solvents are, for example, ethyl ether, butyl ether, dioxane, tetrahydrofuran and the like. These solvents can be used either alone or in admixture with another organic solvent which is inert under the reaction conditions employed. During the step of mixing the reactants, the reaction mixture should be maintained at a relatively low temperature, preferably below 0° C. The reaction can, however, if desired, be carried out at room temperature or above. A particularly advantageous temperature range is a temperature between about −10° C. and about −60° C. After the step of mixing the reactants has been completed, the reaction mixture is stirred continuously with continuous cooling until the reaction is completed. In general, the reaction can be brought to completion by stirring the mixture first at a temperature within the range of about −10° C. to −60° C. for about one hour and thereafter for an additional period of about one hour at room temperature. Upon completion of the reaction, the reaction mixture is hydrolyzed with water and worked up by appropriate and suitable means to isolate the pyridyl ketones. The crude product can, if desired, be further purified by conventional means. Methods of working up the reaction mixture to isolate the reaction product, as well as methods for purifying the product, will be readily apparent to persons skilled in the art. Examples of specific procedures and techniques which are useful in accomplishing this will be found in the examples which follow hereinafter.

The 4-pyridyl methyl carbinols of this invention, i.e., the compounds of Formula II, are prepared by reduction of the corresponding compounds of Formula I. The compound produced by such reduction can be converted, if desired, into a salt with a medicinally acceptable acid.

In general, the reduction of the Formula I compound can be carried out by any method known per se. In a preferred embodiment of the invention, the reduction of the Formula I compound is effected by heating a solution of the same in a suitable inert organic solvent such as a lower alkanol, preferably at a temperature within the range of about 20° C. to about 100° C., in the presence of a reducing agent, e.g., sodium borohydride, tetramethylammonium borohydride, lithium aluminum hydride or metallic sodium in alcohol. Reduction can also be effected with hydrogen in the presence of a suitable catalyst.

Alternatively, the compounds of Formula II can be prepared by the reaction of alkali metal compound of Formula III with an appropriate aldehyde of the formula

RCHO                       V wherein R has the same significance as in Formula II.

The reaction of the 4-picolyl metal compound with the appropriate aldehyde of Formula V is carried out preferably in an inert solvent, for example, benzene, diethyl ether, tetrahydrofuran and the like. The reaction can be carried out over a wide range of temperatures, although it is preferred to operate at a relatively low temperature, suitably below 0° C. The reaction could, however, if desired, be carried out at room temperature or above. A convenient temperature range for carrying out the reaction is between about −10° and −60°.

The following examples are illustrative of the invention. All temperatures are in degrees Centigrade and all melting points are corrected.

Example 1

A gamma picolyl lithium solution was prepared by adding 235 ml. of an ether-benzene solution containing 0.5 mole of phenyl lithium to a stirring solution of 46.6 grams (0.5 mole) of 4-picoline in 350 ml. of tetrahydrofuran over a period of about 30 minutes. The addition was carried out in an atmosphere of dry nitrogen. The reaction mixture was held at 15°–25° with an icebath during the addition and was then stirred for an additional 30 minutes at room temperature. The resulting solution was used whenever a picolyl lithium solution was required in the subsequent examples.

Example 2

To a stirred solution of 0.5 mole of gamma picolyl lithium under dry nitrogen, cooled to −30 to −50° with a bath of Dry Ice-acetone, 0.2 mole of 2-fluorobenzoyl chloride dissolved in 50 to 150 ml. of tetrahydrofuran was added dropwise over a period of ½ to 1 hr. The reaction mixture was allowed to stir overnight and was then hydrolyzed with 100 ml. of water. The reaction mixture was extracted three times with 150 ml. portions of 6 N hydrochloric acid. The acid extract was washed three times with 150 ml. portions of ether and stirred into a mixture of 500 g. of ice and 300 ml. of concentrated ammonium hydroxide. Ice was added as necessary to keep the temperature around 0°. The basic mixture obtained in this way was filtered after 4 hrs. giving a gummy orange solid. The precipitate recovered in this way was extracted with 400 ml. of water and 100 ml. of methylene chloride which were added with vigorous stirring followed by filtration. The methylene chloride-water filtrate was separated and the organic phase dried over magnesium sulfate and reduced in vacuo to 20.0 g. of red crystalline solid. Extraction with 500 ml. of refluxing hexane and crystallization of the hexane solution yielded crystalline 4(2-fluorophenacyl)pyridine. Recrystallization three times from hexane gave pale yellow prisms, melting at 83–85°.

Example 3

In this example 4-(3-fluorophenacyl)pyridine was prepared by the process described in the preceding example using 3-fluorobenzoyl chloride in place of 2-fluorobenzoyl chloride.

In this procedure after the acid extract had been stirred into concentrated ammonium hydroxide the basic mixture was allowed to stand for 4 hrs. giving a red semisolid which was removed by filtration. The precipitate was extracted with 200 ml. of methylene chloride and 300 ml. of water was added with stirring followed by filtration. The methylene chloride filtrate was separated from the water phase, dried over magnesium sulfate and reduced in vacuo to an oil which crystallized after one week of standing. Three recrystallizations from acetone-water gave 4(3-fluorophenacyl)pyridine, melting at 72–75°.

Example 4

In this example 4-(4-fluorophenacyl)pyridine was prepared by the process described in Example 2 using 4-fluorobenzoyl chloride in place of 2-fluorobenzoyl chloride.

The basic mixture obtained after extracting the reaction mixture with acid was stirred with concentrated ammonium hydroxide, allowed to stand for 4 hrs. and filtered. The filtrate obtained in this way was vigorously stirred with 40 ml. of methylene chloride and 400 ml. of water and filtered. The methylene chloride-water filtrate was washed with methylene chloride, the organic layer removed, dried over magnesium sulfate and reduced in vacuo to an oil which crystallized on standing. Yellow needles of 4(4-fluorophenacyl)pyridine, melting at 94–97°, were obtained after three recrystallizations from hexane.

Example 5

In this example 4-(methoxy-phenacyl)pyridine was prepared by the process described in Example 2 using p-methoxy benzoyl chloride in place of 2-fluorobenzoyl chloride.

In this procedure the acid extract was stirred with concentrated ammonium hydroxide and filtered. The filtrate was then extracted with methylene chloride and the organic layer dried over magnesium sulfate and reduced in vacuo to a gummy residue. Crystallization from hexane yielded 4-(methoxy-phenacyl)pyridine. An analytical sample, melting at 103.5–105° was obtained by chromatography over silica gel (Grave, Activated), elution with methylene chloride; and one recrystallization from hexane.

Example 6

In this example 2-furyl-4-pyridylmethyl ketone was prepared by the process described in Example 2 using 2-furoyl chloride in place of 2-fluoro-benzoyl chloride.

*2-furyl-4-pyridylmethyl ketone.*—The basic mixture obtained upon stirring the acid extract into concentrated ammonium hydroxide was filtered, giving a white crystalline solid which was shaken vigorously with 400 ml. of water and 100 ml. of methylene chloride. The methylene chloride wash was dried over magnesium sulfate and reduced in vacuo. The crude product was chromatographed in ethyl acetate over silica gel (Grace, activated) to give pure 2-furyl-4-pyridylmethyl ketone which was recrystallized from ethanolhexane as pale yellow prisms, melting at 115–116°.

Example 7

In this example 4-pyridylmethyl-2-thienyl ketone was prepared by the process described in Example 2 using 2-thienoyl chloride in place of 2-fluoro-benzoyl chloride.

The basic mixture obtained by stirring the acid extract into concentrated ammonium hydroxide was filtered to give a yellow solid which was recrystallized from ethanol-water to give 4-pyridylmethyl-2-thienyl ketone as yellow needles which melted at 96–99°. Recrystallization from ethanol-water gave the pure ketone, melting at 97–99°.

Example 8

In this example cyclohexyl-4-pyridylmethyl ketone hydrochloride was prepared in a manner analogous to the process of Example 2.

A solution of 23.9 g. (0.2 mole) of hexahydrobenzoyl chloride in 75 ml. of anhydrous tetrahydrofuran was slowly added (0.5 hour) to a 0.5 molar solution of picolyl lithium maintained at −20° to −30°. The mixture was then stirred at −20° for 0.5 hr., and at room temperature for 2 hrs. The metal-organic complex was decomposed by the addition of 1 liter of water and the resulting mixture was then acidified with 3 N hydrochloric acid. The layers were separated and the organic phase was extracted with 3 N hydrochloric acid (2×200 ml.). The acid layers were combined, washed with ether (3×200 ml.) and made basic with 10 N sodium hydroxide solution. After standing overnight the solution was filtered. The basic filtrate was extracted with dichloromethane (3×200 ml.). The combined extracts were dried over anhydrous sodium sulfate, filtered and evaporated. The residual oil was extracted with several portions of boiling hexane which were then decanted, combined and cooled. Hydrogen chloride was bubbled through the solution to give 12.1 g. of the ketone hydrochloride. Recrystallization of the salt from methanol-ether, mixture gave the pure compound as pale yellow plates, which melted at 161–167°.

Example 9

*Reduction of 4-(3-florophenacyl)pyridine to 1-(3-fluorophenyl)-2-(4-pyridyl)ethanol.*—To a stirred solution of 2.2 g. (10 mmole) of 4-(3-fluorophenacyl)pyridine in 50 ml. methanol, 2.0 g. of tetramethylammonium borohydride was added in eight portions over 1 hr. Stirring was continued one hour and the reaction mixture was diluted with 500 ml. of ice water. Filtration yielded colorless needles, melting at 60–68°. Three recrystallizations from ethanol-water gave colorless needles of 1-(3-fluorophenyl) 2-(4-pyridyl)ethanol, melting at 69–72°.

Example 10

*Reduction of 4-(4-methoxyphenacyl)pyridine to 1-(methoxyphenyl)-2-(4-pyridyl)ethanol.*—To a stirred solution of 0.8 g. (3.5 mmole) of 4-(4-methoxyphenacyl)pyridine in 25 ml. ethanol, 1.0 g. of tetramethylammonium borohydride was added in four portions over 1 hr. The reaction mixture was stirred overnight and then diluted with 100 ml. ice water. Filtration yielded colorless needles of 1-(4-methoxyphenyl)-2-(4-pyridyl) ethanol melting at 135–137°. Three recrystallizations from ethanol-water gave colorless needles melting at 138–139°.

Example 11

*2(4-pyridyl)-1-(2-thienyl)ethanol.*—To a solution of 1.6 g. (7.9 mmole) of 4-pyridylmethyl-2-thienyl ketone in 75 ml. of ethanol, 1.5 g. of tetramethylammonium borohydride was added in three portions over a period of 45 min. The reaction mixture was allowed to stir overnight and was then diluted with 200 ml. of water. Extraction three times with 50 ml. portions of methylene chloride, drying over anhydrous magnesium sulfate and removal of the solvent in vacuo gave a pale yellow oil. Crystallization from hexane gave colorless needles melting at 94–95°. An analytical sample was prepared by recrystallizations from hexane, melting at 95–96.5°.

Example 12

To a stirred solution of .5 mole of 4-picolyl lithium under dry nitrogen cooled to −30° to −50° with a bath of Dry Ice-acetone, 0.2 mole of cycloheptanoyl chloride dissolved in 50 to 150 ml. of tetrahydrofuran was added dropwise over a period of ½ to 1 hour. The reaction mixture was treated with 100 ml. of water within 3 hours and was extracted three times with 150 ml. portions of 6 N hydrochloric acid. The basic solution was extracted with methylene chloride, dried over magnesium sulfate and reduced in vacuo to 62.0 g. of an oil. This residue was treated with 500 ml. of hot hexane and filtered. The hexane filtrates were reduced in vacuo to yield the crude ketone which was distilled at 152–154°/0.11 mm. A crystalline hydrochloride was formed from ether and recrystallizations from acetone gave colorless cycloheptyl-4-pyridylmethyl ketone having a melting point of 169.5–179.5°.

Example 13

A solution of 0.2 mole of cyclopropanoyl chloride in 300 ml. of anhydrous tetrahydrofuran was added over 30 min. to a stirred ether, benzene solution containing 0.5 mole of 4-picolyl lithium kept at −30° to −40°. After the addition was complete the mixture was allowed to come to room temperature, stirred for an additional 30 min, and then poured into 600 ml. of 4 N hydrochloric acid. The layers were separated and the acid layer was washed with ether (3×100 ml.). The acid layer was cooled to 0° and made basic at that temperature with ammonium hydroxide. Filtration afforded a solid precipitate which was repeatedly extracted with boiling hexane. The hexane extracts were concentrated and cooled to yield, after filtration, the ketone as pale yellow prisms melting at 63–66°.

We claim:

1. A compound of the formula

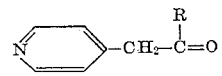

wherein R is a member selected from the group consisting of fluoro substituted phenyl, lower alkoxy substituted phenyl, cycloalkyl of 3 to 7 carbon atoms and monocyclic 5- and 6-membered heterocyclic rings having one hetero atom in the ring which can be either nitrogen, oxygen or sulfur and a pharmaceutically acceptable acid addition salt thereof.

2. A compound according to claim 1 wherein R is fluoro substituted phenyl i.e. a compound of the formula

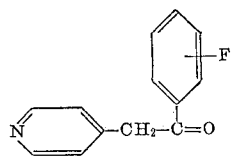

3. A compound according to claim 1 wherein R is lower alkoxy substituted phenyl i.e. a compound of the formula

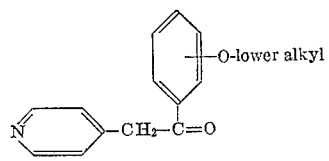

4. A compound according to claim 1 wherein R is 2-furyl i.e. the compound 4-pyridylmethyl-2-furyl ketone.

5. A compound according to claim 1 wherein R is 2-thienyl i.e. the compound 4-pyridylmethyl-2-thienyl ketone.

6. A compound according to claim 1 wherein R is cyclohexyl i.e. the compound cyclohexyl-4-pyridylmethyl ketone.

7. A compound according to claim 1 wherein R is cycloheptyl i.e. the compound cycloheptyl-4-pyridylmethyl ketone.

8. A compound according to claim 1 wherein R is cyclopropyl i.e. the compound cyclopropyl-4-pyridylmethyl ketone.

9. A compound of the formula

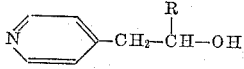

wherein R is a member selected from the group consisting of fluoro substituted phenyl, lower alkoxy substituted phenyl, cycloalkyl of 3 to 7 carbon atoms and monocyclic 5- and 6-membered heterocyclic rings having one hetero atom in the ring which can be either nitrogen, oxygen or sulfur and a pharmaceutically acceptable acid addition salt thereof.

10. A compound according to claim 9 wherein R is fluoro phenyl i.e. a compound of the formula

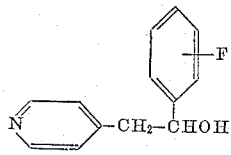

11. A compound according to claim 9 wherein R is lower alkoxy substituted phenyl i.e. a compound of the formula

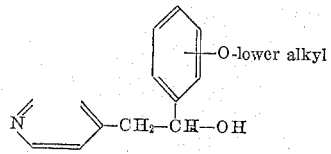

12. A compound according to claim 9 wherein R is 2-thienyl i.e. the compound 2(4-pyridyl)-1-(2-thienyl) ethanol.

References Cited

Branch et al., Tetrahedron, vol. 19 (1963), pp. 401–12.

Zelinsky et al., J. Am. Chem. So., vol. 73, 1951, pp. 696–8.

Tilford et al., J. Am. Chem. Soc., vol. 76, 1954, pp. 2431–41.

JOHN D. RANDOLPH, *Primary Examiner.*

A. L. ROTMAN, *Assistant Examiner.*

UNITED STATES PATENT OFFICE
CERTIFICATE OF CORRECTION

Patent No. 3,371,096                        February 27, 1968

Bernard Brust et al.

It is certified that error appears in the above identified patent and that said Letters Patent are hereby corrected as shown below:

Column 8, line 53, "alkonxy" should read -- alkoxy --.
Column 10, lines 4 to 8, the formula should appear as shown below:

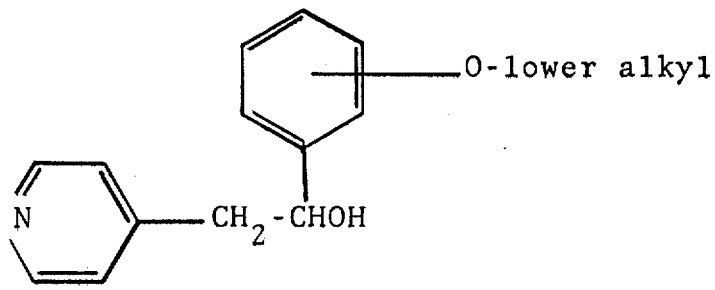

Signed and sealed this 10th day of February 1970.

(SEAL)
Attest:

EDWARD M. FLETCHER, JR.                  WILLIAM E. SCHUYLER, JR.
Attesting Officer                             Commissioner of Patents